United States Patent [19]
Schroeder et al.

[11] Patent Number: 5,238,099
[45] Date of Patent: Aug. 24, 1993

[54] CONVEYING SYSTEM

[75] Inventors: Karl Schroeder, Clayton; William H. McMahon, Ludlow Falls, both of Ohio

[73] Assignee: Premark FEG Corporation, Wilmington, Del.

[21] Appl. No.: 924,774

[22] Filed: Aug. 4, 1992

[51] Int. Cl.[5] .......................................... B65G 47/26
[52] U.S. Cl. .................................... 198/456; 198/457; 198/779
[58] Field of Search ................. 198/456, 457, 779, 365

[56] References Cited

U.S. PATENT DOCUMENTS

| | | | |
|---|---|---|---|
| 3,053,376 | 9/1962 | Rauenbuehler | 198/415 |
| 3,581,875 | 6/1971 | Guis | 198/782 |
| 3,679,043 | 7/1972 | Becker | 198/457 X |
| 3,828,917 | 8/1974 | Oestergren | 198/457 X |
| 3,861,673 | 1/1975 | Ticknor | 271/225 |
| 3,888,342 | 6/1975 | Geller | 198/789 |
| 4,143,755 | 3/1979 | Keller | 198/456 |
| 4,456,116 | 6/1984 | Jarman | 198/456 X |
| 4,681,211 | 7/1987 | Lodige et al. | 198/789 |

OTHER PUBLICATIONS

Heliroll Cargo Rotation & Transfer Table 1990 FMC Corporation.
Navigator Powered Ball Deck 1991 FMC Corporation.

Primary Examiner—Robert P. Olszewski
Assistant Examiner—James R. Bidwell
Attorney, Agent, or Firm—Russell L. McIlwain

[57] ABSTRACT

A conveying system includes a first continuous belt supported horizontally at two ends by a pair of rollers. A plurality of balls are mounted to the belt for rotation. A second conveyor belt is positioned within the space between the rollers defined by the upper and lower portions of the first belt such that the upper surface of the second belt contacts the balls of the first belt. As the two belts are rotated, articles may be conveyed by the first belt and rotation of the balls by the second belt causes the articles to move diagonally over the upper surface of the first belt whereupon they may be justified to one side or the other of the belt.

7 Claims, 5 Drawing Sheets

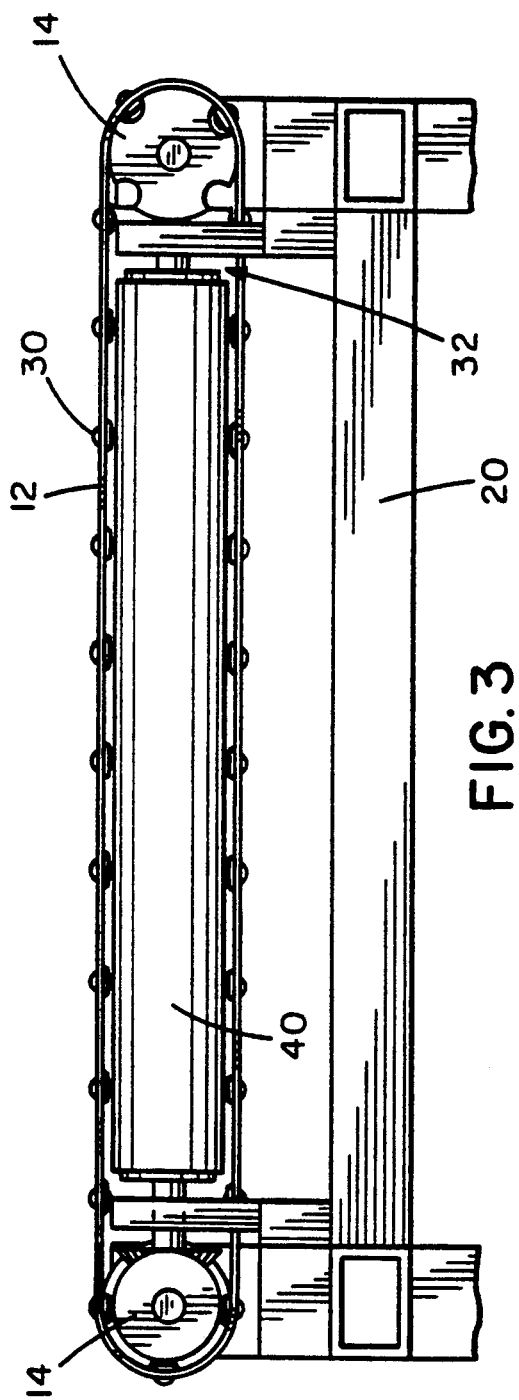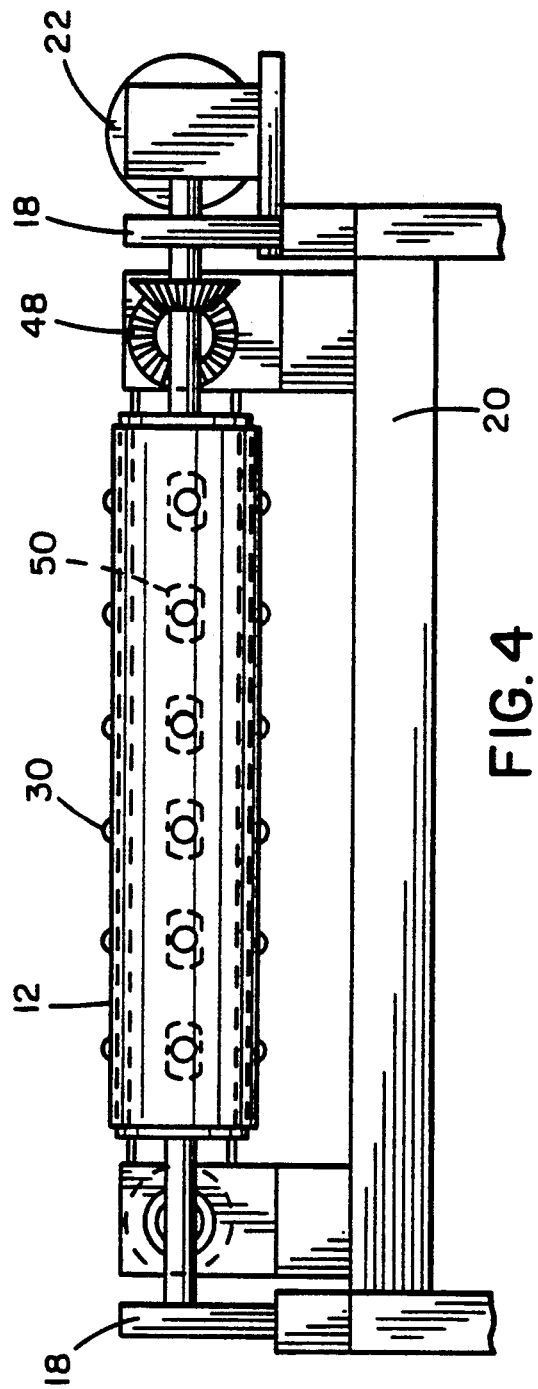

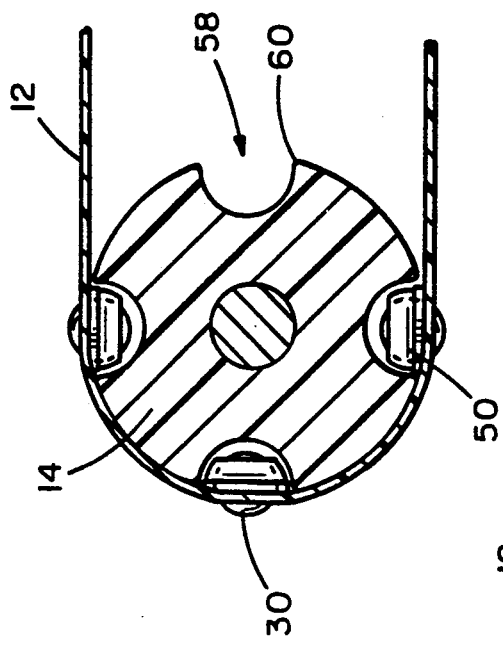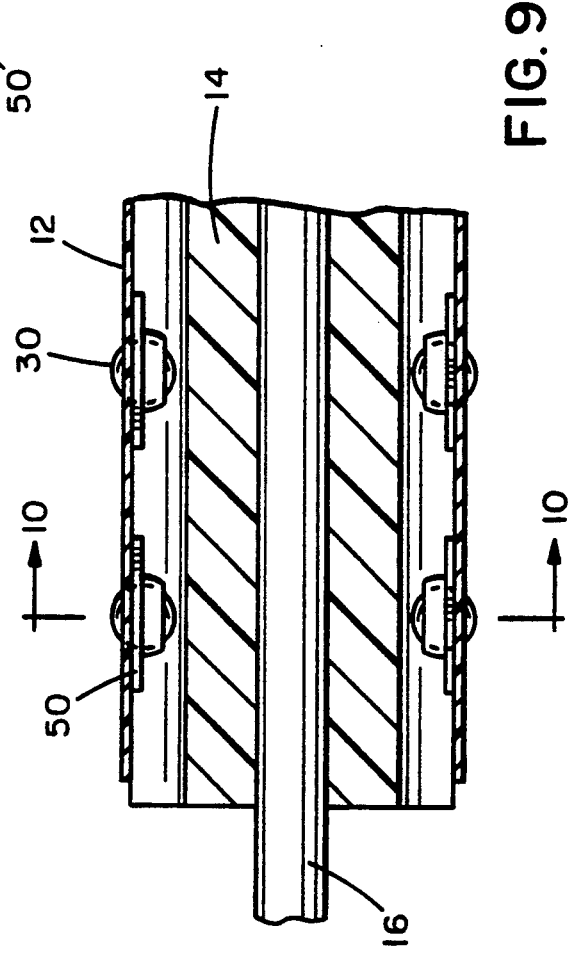

CONVEYING SYSTEM

BACKGROUND OF THE INVENTION

1. Field of the Invention

The present invention relates generally to a system for conveying articles of various types and, more particularly, to a conveying system which comprises a continuous belt and has the capability of aligning articles on the belt as they are transported.

2. Description of the Prior Art

In numerous commercial and industrial processes it is necessary to transport articles of various types by the use of conveyor systems. A typical conveyor system may consist of one or more continuous belts supported at their ends by rollers and driven by a motor through conventional gear or chain and sprocket arrangements. One application for conveyors is in the food packaging business wherein a trayed food product is fed into a wrapping machine and is discharged from the machine enclosed in a heat shrinkable or stretch film. Once these packages have been wrapped, it is sometimes preferred to transport them to another machine which automatically applies labels to them, identifying the contents of the package. Labelled packages of this type are commonly seen in the produce or meat sections of grocery stores, for example.

In transporting a package from a wrapping machine to an automatic labeler it is desirable to align the package such that the label can be applied to the package in a preselected position and orientation. The placement of the label can be critical to the appearance of the package from the standpoint of permitting the contents of the package to be viewed without interference by the label. Typically, a produce or meat package has a label in one of its corners so that the consumer can readily inspect the package contents. In order to properly align the package for labeling, devices such as guide rails may be used to adjust the position of the package on the conveyor. However, guide rails may not be suitable for aligning packages where the packages vary in size as they discharge from the wrapping machine. Accordingly, it would be desirable to provide a conveying system having the capability of both transporting articles and aligning them.

SUMMARY OF THE INVENTION

The present invention provides a conveying system wherein a continuous belt is supported at two ends for rotation and has a plurality of spherical members or balls mounted to it in multiple rows. The balls are retained in the belt in sockets such that surfaces of the balls are exposed on both sides of belt. The end supports for the belt are rollers having longitudinal channels for receiving the balls as the belt passes over them. In the space defined between the upper belt surface and lower belt surface a second conveyor-like belt is mounted such that its direction of movement is at right angles to the first belt. The second belt has a conventional plain surface which is juxtaposed against the exposed bottom surfaces of the balls of the first belt. When the two belts are moving, the balls of the first belt rotate in a direction which is diagonal to the direction of movement of the first belt. Thus, articles placed on the first belt move to one side of the first belt as they are being conveyed in the direction of the first belt's movement. A rail can be provided along the edge of the first belt s that the articles on the belt become aligned or justified. If the second belt direction is reversed, the articles move to the opposite side of the first belt. Accordingly, by controlling the direction of the second belt, articles may be selectively moved to one or the other side of the best, as desired, and sorting of the articles may be accomplished.

BRIEF DESCRIPTION OF THE DRAWINGS

The features and advantages of the invention will become apparent from the following detailed description taken in connection with the accompanying drawings wherein:

FIG. 3 is a cross-sectional view taken substantially along the line 3—3 of FIG. 2;

FIG. 4 is a cross-sectional view taken substantially along the line 4—4 of FIG. 2;

FIG. 8 is a cross-sectional view taken substantially along the line 8—8 of FIG. 6;

FIG. 9 is a partial cross-sectional view of a roller member used in the conveying system; and FIG. 10 is a cross-sectional view taken substantially along the line 10—10 of FIG. 9.

DETAILED DESCRIPTION OF THE PREFERRED EMBODIMENTS

Figure 1:
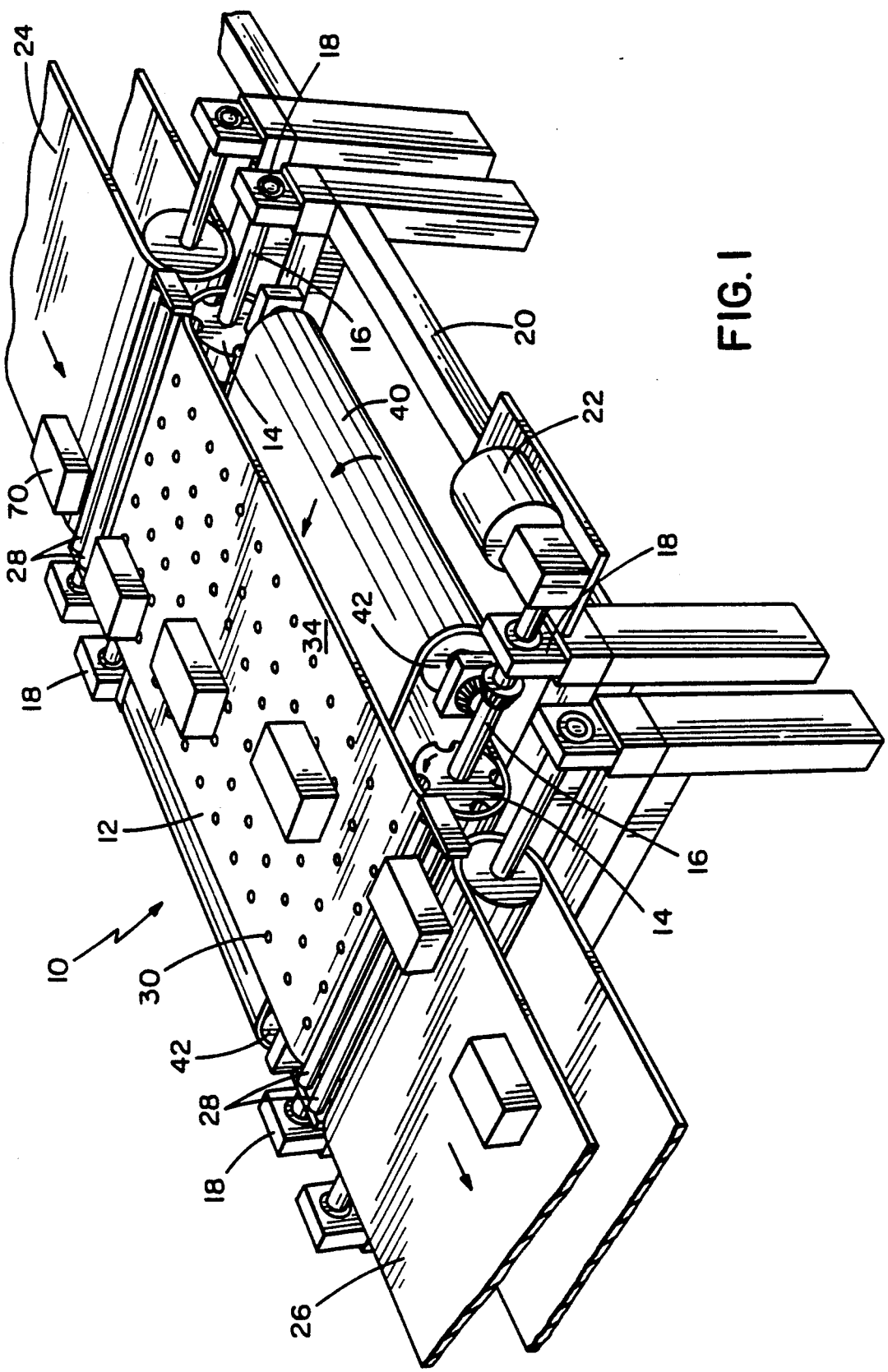
FIG. 1 is a perspective view of one embodiment of a conveying system constructed in accordance with the invention.
Figure 2:
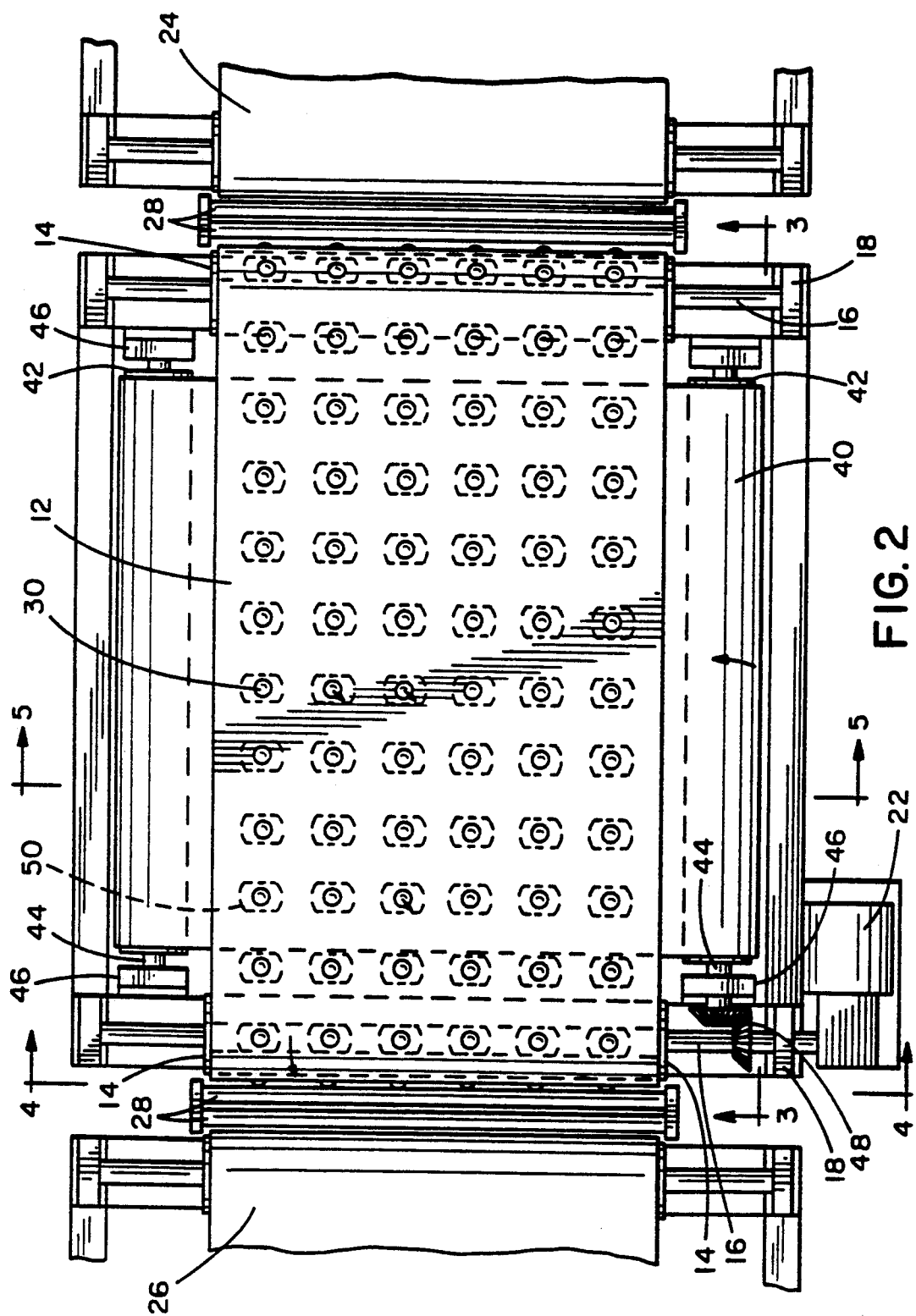
FIG. 2 is a top plan view thereof.
Figure 5:
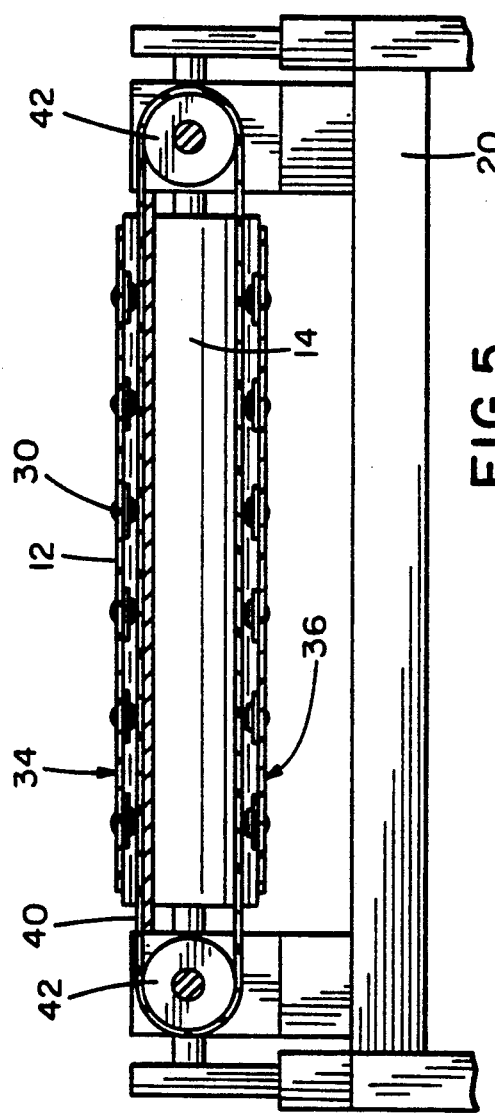
FIG. 5 is a cross-sectional view taken substantially along the line 5—5 of FIG. 2.

Referring now to the drawings, and initially to FIGS. 1-5, a conveying system, designated generally by the reference numeral 10, includes a first continuous belt 12 supported for rotation at two ends by a pair of rollers 14. The rollers 14 are carried by shafts 16 which in turn ar journalled for rotation in pillow blocks 18. The pillow blocks 18 are mounted to a suitable stand arrangement 20. Rotation of one of the rollers 14 is provided by a motor 22, or the like. As seen in FIG. 1, the conveying system 10 may be included as a component of a larger system wherein a conventional conveyor belt 24 feeds the belt 12 and another belt 26 takes off from the belt 12. In such an arrangement transition rollers 28 may be provided to fill the gaps between the respective belts 12, 24 and 26. In accordance with the invention, the belt 12 is fitted with a plurality of spherical members or balls 30, arranged in uniform rows for purposes which will be described hereinafter.

The rollers 14 define a space 32 between upper belt surface 34 and lower belt surface 36. Interposed within this space 32 is a second continuous belt 40 which is supported for rotation on a pair of rollers 42. These rollers 42 are carried by shafts 44 which are journalled for rotation in pillow blocks 46. In one embodiment of the invention, one of the shafts 44 may be connected by a gear arrangement 48 to a shaft 16 of the first belt roller 14, whereby the second belt roller 42 is also driven by the motor 22.

Figure 7:
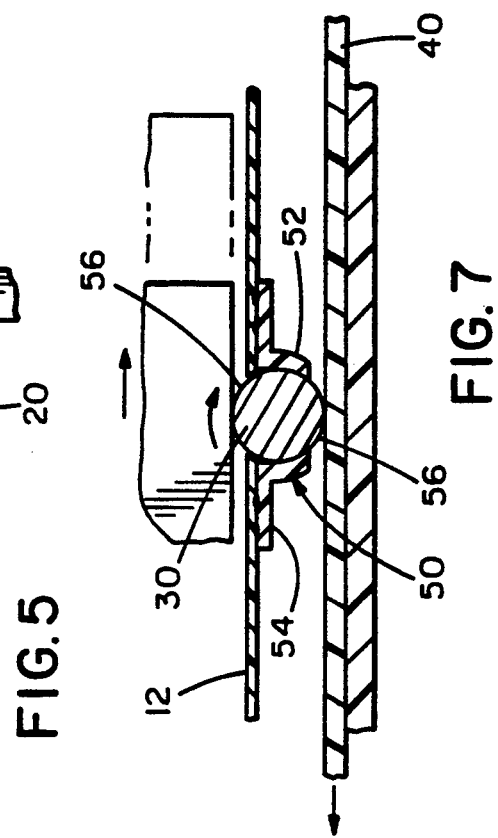
FIG. 7 is a cross-sectional view taken substantially along the line 7—7 of FIG. 6.
Figure 6:
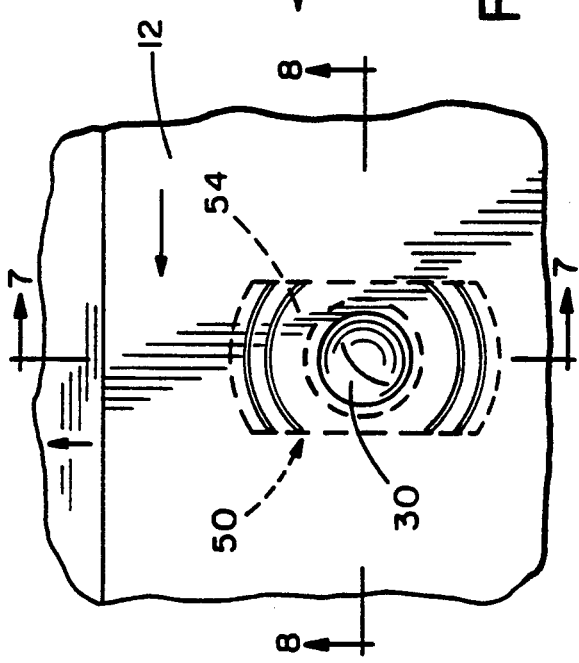
FIG. 6 is a fractional plan view of the uppermost belt surface of the conveying system.

Turning now to FIGS. 6, 7 and 8, the mounting arrangement for the balls 30 can be seen to include a plurality of retainers 50. Each retainer 50 is a unitary member molded, for example, from Nylon and includes a cup-like portion 52 and flange 54. The retainers 50 are positioned in registry with circular apertures formed in the belt 12 and may be ultrasonically welded to the belt 12. The configuration of the apertures and retainers 50 is such as to loosely trap the balls 30 so that they can freely rotate without disassociating from the belt 12 and with the balls having exposed surfaces 56 on each side of the belt 12. As best seen in FIG. 10, to accommodate rotation of the belt 12 and ball 30 assembly, the rollers 14 are provided with radiused channels 58 running the length thereof. The channels 58 are configured to receive the retainers 50 and balls 30 as the belt 12 passes over the roller 14 surfaces. Edges 60 of the channels 58 serve to engage the flanges 54 of the retainers 50 so that the belt 12 is prevented from slipping around the rollers 14.

It can be appreciated that the conveying system 10 provides an efficient means for redirecting or aligning articles of various types. As seen in FIG. 1, an article 70 may be delivered to the conveying system 10 in proximity with on edge of the belt 12 and as it is carried by the belt 12 it is displaced laterally to the opposite edge of the belt 12. If aligning of the articles 70 is desired, the conveying system 10 can include a rail (not shown) along one edge of the belt 12 so that articles 70, regardless of size, may be displaced laterally until one edge of the article 70 abuts the rail whereby the articles 70 are edge-wise justified. Thus, the articles 70 may be delivered for other operations such as labelling, in the case of wrapped packages.

In another embodiment of the invention, the roller 42 of the second belt 40 may be connected by a suitable gear or chain and sprocket arrangement to a separate motor, instead of being driven by motor 22. In this conveying system the timing and direction of belt 40 may be controlled independently of belt 12 so that the relative lateral displacements of the articles 70 can be individually predetermined. Thus, the conveying system 10 may be used to provide for sorting articles by directing them to a downstream divider system according to any desired criteria.

While the present invention has been described in connection with particular embodiments thereof, it will be understood by those skilled in the art that many changes may be made without departing from the true spirit and scope of the present invention.

We claim:

1. A conveying system comprising:
   a first continuous belt supported at two ends by a pair of rollers, said belt defining an upwardly facing belt surface and a downwardly facing belt surface with a space therebetween;
   a plurality of balls mounted to said belt for rotation; and
   means positioned within said space for rotating said balls from the underside of said upwardly facing belt surface.

2. The conveying system of claim 1 wherein said means for rotating said balls includes a second continuous belt.

3. The conveying system of claim 2 wherein said first an second belts are coupled together by a gear system and driven simultaneously by a single driving member.

4. The conveying system of claim 1 wherein said rollers are provided with channels for receiving said balls when said belts pass around said rollers.

5. The conveying system of claim 2 wherein said second belt is mounted for movement in a direction transverse to said first belt.

6. The conveying system of claim 2 wherein said first and second belts are coupled together so as to be driven by a common motor.

7. The conveying system of claim 2 wherein said first and second belts are driven independently.

* * * * *